US006351790B1

(12) United States Patent
Jones

(10) Patent No.: US 6,351,790 B1
(45) Date of Patent: Feb. 26, 2002

(54) CACHE COHERENCY MECHANISM

(75) Inventor: Andrew Michael Jones, Bristol (GB)

(73) Assignee: STMicroelectronics Limited, Almondsbury Bristol (GB)

(*) Notice: Subject to any disclaimer, the term of this patent is extended or adjusted under 35 U.S.C. 154(b) by 0 days.

(21) Appl. No.: 09/270,142

(22) Filed: Mar. 16, 1999

(30) Foreign Application Priority Data

Mar. 23, 1998 (GB) .............................................. 9806184

(51) Int. Cl.$^7$ .......................... G06F 12/14; G06F 13/00
(52) U.S. Cl. ...................... 711/141; 711/133; 711/148; 711/142; 711/143; 711/144; 711/145; 711/146
(58) Field of Search ................................ 711/143, 141, 711/142, 146, 133, 134, 144, 145, 202, 121, 122, 148; 710/107

(56) References Cited

U.S. PATENT DOCUMENTS

| | | | | |
|---|---|---|---|---|
| 4,755,930 A | * | 7/1988 | Wilson, Jr. et al. | 711/122 |
| 5,025,365 A | * | 6/1991 | Mathur et al. | 711/121 |
| 5,091,846 A | | 2/1992 | Sachs et al. | 395/250 |
| 5,301,287 A | * | 4/1994 | Herrell et al. | 711/202 |
| 5,394,555 A | * | 2/1995 | Hunter et al. | 711/148 |
| 5,978,874 A | * | 11/1999 | Singhal et al. | 710/107 |
| 6,128,706 A | * | 10/2000 | Bryg et al. | 711/411 |
| 6,134,634 A | * | 10/2000 | Marshall, Jr. et al. | 711/143 |

OTHER PUBLICATIONS

Raja et al., "A Hardware Cache Coherency Scheme for Multiprocessors", (c) 1993, p. 181–184.*
Singh et al., "Parallel Radiosity Computation On a Shared Memory Multiprocessor", (c) 1993, p. 165–168.*
Standard Search Report from the European Patent Office for RS 102461.
Lilja, D.J. et al., Improving memory tilization in Cache Coherence Directories, IEEE Transactions on Parallel and Dist. Systems, vol. 4, No. 10 Oct. 1, 1993, pp. 1131–1133.
Cytron et al., Automatic Management of Programmable Caches (Extended Abstract) Proceedings of the 1988 Internat'l Conf. On Parallel Processing, Aug. 15, 1988, pp. 229–238, XP000212122.
Handy, The Cache Memory Book, (c) 1998, 1993, pp. 66, 156, 145.*

* cited by examiner

Primary Examiner—Matthew Kim
Assistant Examiner—R. Peugh
(74) Attorney, Agent, or Firm—Wolf, Greenfield & Sacks, P.C.; James H. Morris

(57) ABSTRACT

A cache coherency mechanism for a computer system having a plurality of processors, each for executing a sequence of instructions, at least one of the processors having a cache memory associated therewith. The computer system includes a memory that provides an address space where data items are stored for use by all of the processors. A behavior store holds in association with an address of each item, a cache behavior identifying the cacheable behavior of the item, the cacheable behaviors including a software coherent behavior and an automatically coherent behavior. When a cache coherency operation is instigated by a cache coherency instruction, the operation is effected dependent on the cacheable behavior associated with the specified address of the item. Methods for modifying the coherency status of a cache are also described.

31 Claims, 4 Drawing Sheets

CACHE COHERENCY MECHANISM

FIELD OF THE INVENTION

The present invention relates to a computer system and to a cache coherency mechanism therefor.

BACKGROUND TO THE INVENTION

As is well known in the art, cache memories are used in computer systems to decrease the access latency to certain data and code and to decrease the memory bandwidth used for that data and code. A cache memory can delay, aggregate and reorder memory accesses.

A cache memory operates between a processor and a main memory of a computer. Data and/or instructions which are required by the process running on the processor can be held in the cache while that process runs. An access to the cache is normally much quicker than an access to main memory. If the processor does not locate a required data item or instruction item in the cache memory, it directly accesses main memory to retrieve it, and the requested data or instruction item is loaded into the cache. There are various known systems for using and refilling cache memories.

A computer system may have more than one processor, and each processor may have its own cache. Alternatively, a processor may have a plurality of CPUs, each with its own cache. However, these caches will commonly access a single main memory resource.

FIG. 1 illustrates a case where there are two processors (2) CPU1, CPU2 each with their own cache (22) CACHE1, CACHE2. The caches share a single memory resource MEM(6). FIG. 2 shows what can happen in such a situation. Consider an address in main memory 1010. This maps onto cache location 10 in both CACHE1 and CACHE2. The value $V_3$ stored at address 1010 had an initial value of X, and the value $V_3$=X was initially stored at cache location 10 in both of the caches. At that stage, the data item $V_3$ was "visible", that is either the processor accessing address 1010 would retrieve from its cache the value $V_3$=X. However, the CPU1 has executed a process, modified the value $V_3$=Y and returned this to the location 10 in CACHE1. Now, the value $V_3$=X in main memory is "dirty"—it no longer reflects the current value of $V_3$. Moreover, the value $V_3$=X in CACHE2 is "stale"—it differs from the true value. Clearly, this situation needs to be rectified before CPU2 attempts to retrieve $V_3$, because otherwise it will wrongly retrieve $V_3$=X.

Thus cache coherency control is required to ensure that several processors and devices can correctly share memory. This can be achieved by:

1. Automatic coherency. Additional hardware guarantees that loads can retrieve the most recently written value regardless of which processor or device wrote it. Note that a functional, but low performance, implementation of automatic coherency is to disable the cache. Such additional hardware COHERE is referenced 3 in FIG. 1.
2. Software coherency. Special code sequences are used in the program to control the transfer of data between cache and memory. They allow precise control of coherency and efficient use of the cache.

The visibility of data depends on whether the cache is automatically coherent or not. If the cache is not automatically coherent then only the contents of memory and its own cache are visible to a processor. Software has to cooperate to ensure that data is written to memory when appropriate. If the cache is automatically coherent then the most recently written value by any processor will be visible to all other processors.

Visibility Definitions

Visible A data item is visible to a processor if a load from the data item's address will return that item.

Stale A data item is stale if the value in the cache is different from the last value written.

Dirty A data item is dirty if it has been modified in the cache with respect to main memory.

In a situation where a process wishes to clear a location in the cache, but the process does not have access to the address stored at that cache location, existing software coherency techniques require usage of a special, privileged mode of processor operation termed kernel mode. In a normal user mode it is not possible in such a circumstance to render the cache coherent using software coherency techniques other than by transfer into kernel mode.

Furthermore, contemporary processors, which have flexible cache coherency mechanisms, usually require software to specify, either by a property of the page translation or by the execution of instructions, the extent to which coherency will be actively managed by instruction sequences and the extent to which hardware will be responsible for maintaining coherency. This leads to the problem that code written for one model will not provide coherency if implemented on hardware with different coherency restrictions. For example, software written assuming a hardware coherency mechanism (e.g. MESI) will not generally run correctly on implementations for which no specific hardware has been provided.

SUMMARY OF THE INVENTION

According to one aspect of the present invention there is provided a computer system comprising a plurality of processors, each comprising an execution unit for executing a sequence of instructions and at least one of the processors having associated there with a cache memory having a plurality of cache locations for holding items for use by the processor; storage circuitry having addressable storage locations in the memory address space of said at least one processor in which items are stored for use by the processors; a behaviour store for holding in association with an address of an item a cache behaviour identifying the cacheable behaviour of the item, wherein the cacheable behaviours include a software coherent behaviour and an automatically coherent behaviour and wherein the instructions for execution by the execution unit include cache coherency instructions which each specify an operation to be executed on the contents of a cache location and an address in the storage circuitry; each processor being operable responsive to the cache coherency instructions to execute an operation on the contents of the specified cache location and to effect a cache coherency operation to render the contents coherent with the storage circuitry in a manner dependent on the cacheable behaviour of the specified address and whether or not the processor contains a cache coherency unit for automatically implementing coherency.

Where the computer comprises a cache coherency unit for automatically implementing coherency, the cache coherency instructions effect a cache coherency operation for automatically coherent and software coherent behaviour dependent on the nature of the cache coherency unit. Where the computer system has no cache coherency unit for automatically implementing coherency, items having an automatically coherent behaviour are denied access to the cache memory.

In the computer system, each of the processors can have a respective cache memory associated therewith. The storage circuitry can be a main memory accessible by all the processors.

In the cache memory, each item can be stored in association with a valid bit (which indicates whether or not that item is valid) and/or a dirty bit (which indicates whether or not that item has been modified with respect to the main memory).

The cacheable behaviours can include:
an unshared behaviour for items unique to one of said processors;
an uncacheable behaviour for accesses to memory devices other than said storage circuitry; and
a device behaviour for accesses to devices other than memory devices, said devices being addressable in the memory address space of the processors.

One type of cache coherency instruction is a flush instruction which makes dirty items in the cache memory associated with said at least one processor visible to the other processors.

Another cache coherency instruction is a purge instruction which removes items from the cache memory.

Another type of cache coherency instruction is a validate instruction which ensures that stale items are not read from the cache memory.

According to another aspect of the present invention there is provided a method of modifying the coherency status of the contents of a cache in a computer system comprising a plurality of processors each having an execution unit for executing a sequence of instructions and at least one of the processors having associated therewith a cache memory, and storage circuitry having addressable storage locations in the memory address space of said at least one processor in which items are stored for use by the processors, the method comprising: defining for each item a cacheable behaviour of the item, wherein the cacheable behaviours include a software coherent behaviour and an automatically coherent behaviour; holding in a behaviour store in association with an address for each item a cache behaviour identifying the cacheable behaviour of the item; executing in the execution unit cache coherency instructions which each specify an operation to be executed on the contents of a cache location in the cache memory and an address in the storage circuitry; executing an operation on the contents of the specified cache location and effecting a cache coherency operation to render the contents coherent with the storage circuitry in a manner dependent on the cacheable behaviour of the specified address and whether or not the processor contains a cache coherency unit for automatically implementing coherency.

The cache can be partitioned into a plurality of cache partitions, wherein the cache partition containing the relevant location in the cache is determined in dependence on the specified address in main memory. More details of a particular cache partitioning implementation may be obtained from our earlier U.S. application Ser. No. 09/014,315.

The cache (or each cache partition) can be direct mapped. However, other associativities are possible.

The main memory can be organised in pages, each page comprising a sequence of addresses. In that case, the cache coherency instruction can specify a page in main memory for which the operation is to be executed, the operation being executed for each of the sequence of addresses in the specified page. Cacheable behaviour can be page-related.

In the preferred embodiment, the processor has a user mode of operation and a privileged (kernel) mode of operation. Cache coherency instructions are executable in the user mode.

The coherency mechanism described herein enables the writing of portable code which requires coherent shared memory whilst allowing performance optimisation of how the coherency is managed.

For a better understanding of the present invention and to show how the same may be carried into effect, reference will now be made by way of example to the accompanying drawings.

DESCRIPTION OF THE PREFERRED EMBODIMENT

Prior to describing a cache coherency mechanism, there will first be described a cache architecture within which the mechanism can be implemented.

Figure 3:
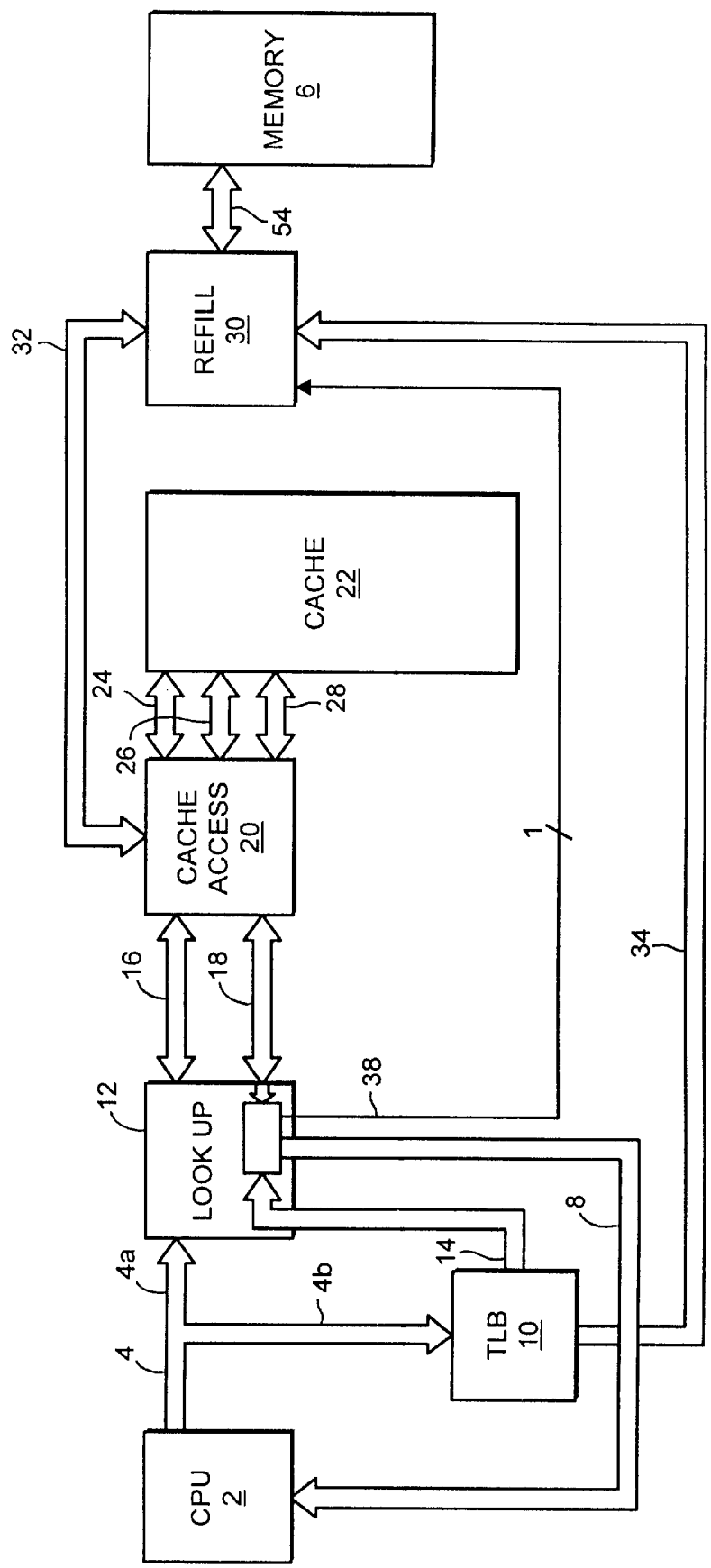
FIG. 3 is a block diagram of a computer incorporating a cache system.

FIG. 3 is a block diagram of a computer incorporating a cache system. The computer comprises a CPU 2 which is connected to an address bus 4 for accessing items from a main memory 6 and to a data bus 8 for returning items to the CPU 2. Although the data bus 8 is referred to herein as a data bus, it will be appreciated that this is for the return of items from the main memory 6, whether or not they constitute actual data or instructions for execution by the CPU. The system described herein is suitable for use on both instruction and data caches. As is known, there may be separate data and instruction caches, or the data and instruction cache may be combined. In the computer described herein, the addressing scheme is a so-called virtual addressing scheme. The address is split into a line in page address 4a and a virtual page address 4b. The virtual page address 4b is supplied to a translation look-aside buffer (TLB) 10. The line in page address 4a is supplied to a look-up circuit 12. The translation look-aside buffer 10 supplies a real page address 14 converted from the virtual page address 4b to the look-up circuit 12. The look-up circuit 12 is connected via address and data buses 16,18 to a cache access circuit 20. Again, the data bus 18 can be for data items or instructions from the main memory 6. The cache access circuit 20 is connected to a cache memory 22 via an address bus 24, a data bus 26 and a control bus 28 which transfers replacement information for the cache memory 22. A refill engine 30 is connected to the cache access circuit 20 via a refill bus 32 which transfers replacement information, data items (or instructions) and addresses between the refill engine and the cache access circuit. The refill engine 30 is itself connected to the main memory 6.

The refill engine 30 receives from the translation look-aside buffer 10 a full real address 34, comprising the real page address and line in page address of an item in the main memory 6. The refill engine 30 also receives a miss signal on line 38 which is generated in the look-up circuit 12 in a manner which will be described more clearly hereinafter.

The cache memory 22 described herein is a direct mapped cache, although this is not necessary to implement the invention. That is, it has a plurality of addressable storage locations, each location constituting one row of the cache. Each row contains an item from main memory and part of the address in main memory of that item. Each row is addressable by a row address which is constituted by a number of bits representing the least significant bits of the address in main memory of the data items stored at that row. For example, for a cache memory having eight rows, each row address would be three bits long to uniquely identify those rows. For example, the second row in the cache has a row address 001 and thus could hold any data items from main memory having an address in the main memory which ends in the bits 001. Clearly, in the main memory, there would be many such addresses and thus potentially many data items to be held at that row in the cache memory. Of course, the cache memory can hold only one data item at that row at any one time.

The cache memory includes a tag RAM 23 (FIG. 7) which holds for each row a tag identifying the page (by page address or some bits thereof) for the item held in that row in the cache.

Figure 4:
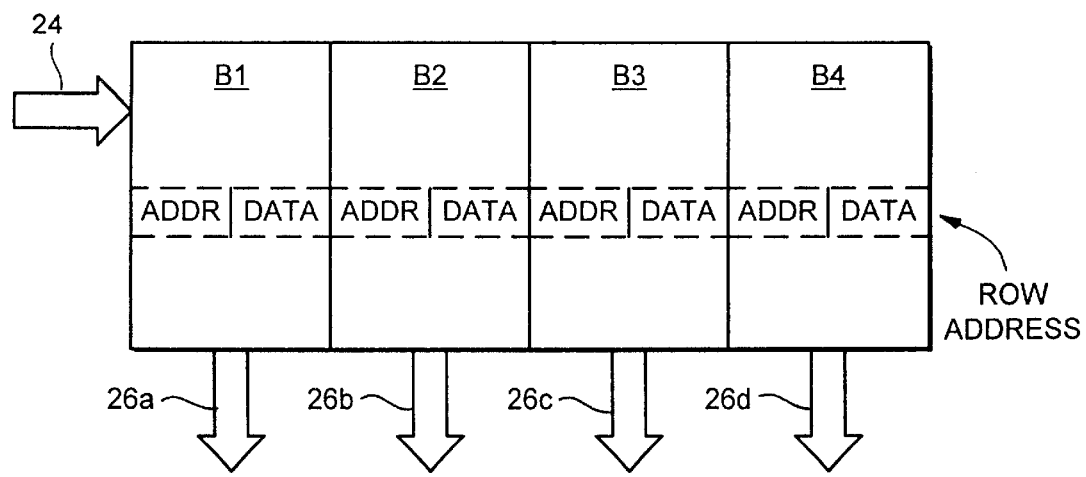
FIG. 4 is a sketch illustrating a four way set associative cache.

To provide a cache system with greater flexibility, an n-way set associative cache memory has been developed. An example of a 4-way set associative cache is illustrated in FIG. 4. The cache memory is divided into four banks B1, B2, B3, B4. The banks can be commonly addressed row-wise by a common row address, as illustrated schematically for one row in FIG. 4. However, that row contains four cache entries, one for each bank. The cache entry for bank B1 is output on bus 26a, the cache entry for bank B2 is output on bus 26b, and so on for banks B3 and B4. Thus, this allows four cache entries for one row address (or line in page address). Each time a row is addressed, four cache entries are output and the real page numbers of their addresses are compared with the real page number supplied from the translation look-aside buffer 10 to determine which entry is the correct one. If there is a cache miss upon an attempted access to the cache, the refill engine 30 retrieves the requested item from the main memory 6 and loads it into the correct row in one of the banks, in accordance with a refill algorithm which is based on, for example, how long a particular item has been held in the cache, or other program parameters of the system. Such replacement algorithms are known and are not described further herein.

Basic operation of the computer system illustrated in FIG. 3 will now be described, as though the cacheable behaviours of different pages did not exist. The CPU 2 requests an item from main memory 6 using the address in main memory and transmits that address on address bus 4. The virtual page number is supplied to the translation look-aside buffer 10 which translates it into a real page number 14 according to a predetermined virtual to real page translation algorithm. The real page number 14 is supplied to the look-up circuit 12 together with the line in page number 4a of the original address transmitted by the CPU 2. The line in page address is used by the cache access circuit 20 to address the cache memory 22. The line in page address includes a set of least significant bits (not necessarily including the end bits) of the main address in memory which are equivalent to the row address in the cache memory 22. The contents of the cache memory 22 at the row address identified by the line in page address, being a data item (or instruction) and the address in main memory (or the tag) of the data item (or instruction), are supplied to the look-up circuit 12. There, the real page number of the address which has been retrieved from the cache memory is compared with the real page number which has been supplied from the translation look-aside buffer 10.

If these addresses match, the look-up circuit indicates a hit and generates a Match Signal MS (FIG. 6), which causes the data item which was held at that row of the cache memory to be returned to the CPU along data bus 8. If however the real page number of the address which was held at the addressed row in the cache memory 22 does not match the real page number supplied from the translation look-aside buffer 10, then a miss signal is generated on line 38 to the refill engine 30. It is the task of the refill engine 30 to retrieve the correct item from the main memory 6, using the real address which is supplied from the translation look-aside buffer 10 on bus 34. The data item, once fetched from main memory 6 is supplied to the cache access circuit 20 via the refill bus 32 and is loaded into the cache memory 22 together with the address in main memory. The data item itself is also returned to the CPU along data bus 8 so that the CPU can continue to execute. In a direct mapped cache memory as outlined above, it will be apparent that the data item and its address recalled from the main memory 6 will be loaded into the storage location from which the data item was originally accessed for checking. That is, it will be over-written into one of a small number of locations which can accept it, having a row address matching the set of least significant bits in the line in page address in main memory.

Figure 5:
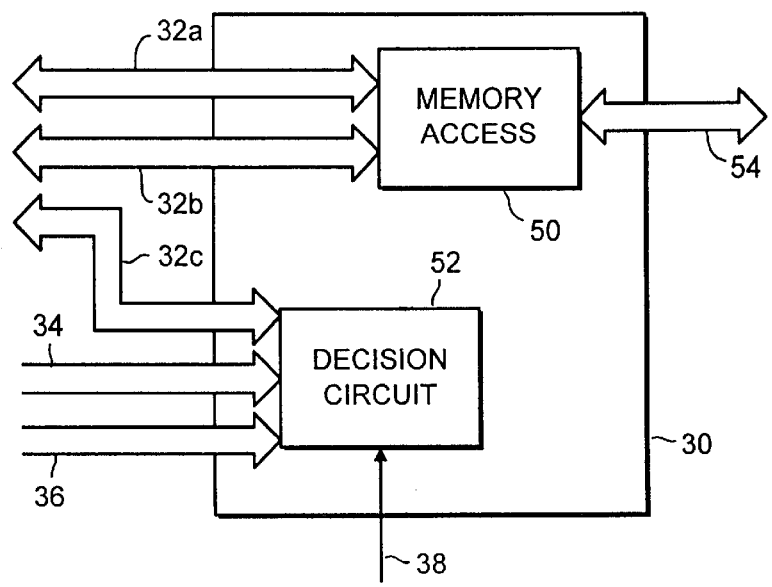
FIG. 5 is a block diagram of the refill engine.

FIG. 5 illustrates in more detail the content of the refill engine 30. The refill bus 32 is shown in FIG. 5 as three separate buses, a data bus 32a, an address bus 32b and a bus 32c carrying replacement information. The address and data buses 32b and 32a are supplied to a memory access circuit 50 which accesses the main memory via the memory bus 54. The replacement information is fed to a decision circuit 52 which also receives the real address 34 and the miss signal 38. The decision circuit 52 determines the proper location of the cache into which data accessed from the main memory is to be located.

Some possible variations on the above described embodiment are mentioned below.

In the described embodiment above, the address issued by the CPU on address bus 4 is split into a virtual page number 4b and a line in page 4a. However, the entire virtual address could be sent from the CPU to the look-up circuit for the cache. Conversely, the CPU could issue real addresses directly to the look-up circuit.

In the embodiment described above, a single cache access circuit 20 is shown for accessing the cache both on look-up and refill. However, it is also possible to provide the cache with an additional access port for refill, so that look-up and refill take place via different access ports for the cache memory 22.

In the described embodiment, the refill engine 30 and cache access circuit 20 are shown in individual blocks. However, it would be quite possible to combine their functions into a single cache access circuit which performs both look-up and refill.

Figure 2:
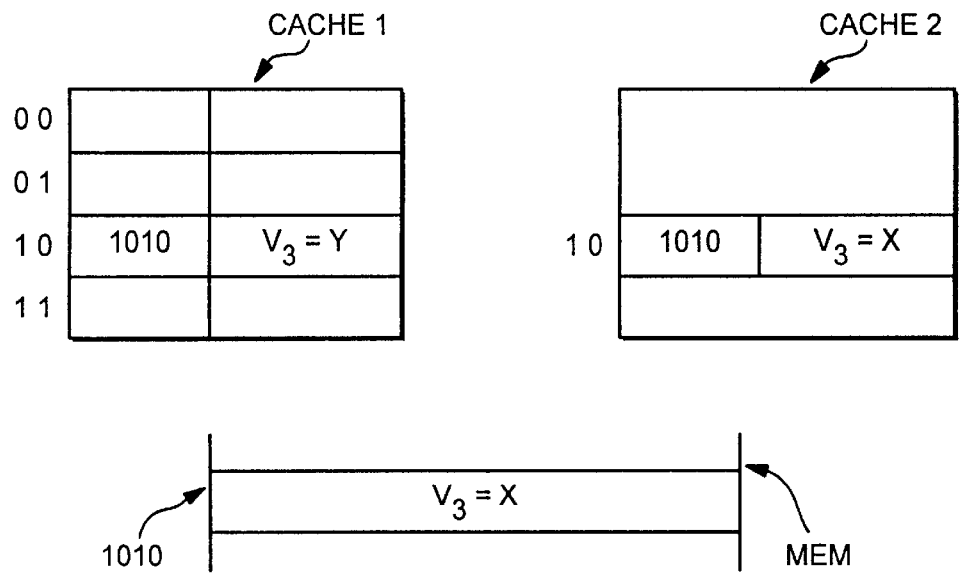
FIG. 2 illustrates "stale" and "dirty" data items.

As can be seen in FIGS. 2 and 4, each location in the cache holds an address in main memory and the item (data or instruction) from that address in main memory. It is not necessary for the whole of the memory address to be held at the cache location. For example the most significant bits of the address would generally be held to constitute a tag for that cache entry and is held in the tag RAM 23. This is known in the art and is not described further herein.

The principles of the invention will now be described in more detail with reference to the following examples. The cache coherency mechanism revolves around the data cache instructions flush, purge and validate and how they act on the cache and memory. The action of each of these instructions is dependent on the type of the page on which the data resides and whether the implementation has hardware to assist in the maintenance of coherence.

The developer of the software targets their code to the model which they believe will be most effective—either by dint of performance or simplicity. The two cacheable page types which allow sharing are known as software coherent and automatically coherent. Here, software written which uses either (or both) page types will work on a wide variety of implementations without requiring the provision of coherency hardware.

For data resident on pages of type automatically coherent, the software program does not include any coherency instructions (flush, purge, validate) to maintain coherency—the implementation guarantees this automatically. For data resident on pages of type software coherent, software takes full responsibility for keeping data coherent in the system. It does this by issuing coherency instructions to establish coherency at appropriate points in the software.

The key advantages of this are that:

1. It does not require the implementation to provide coherency hardware to support automatic coherency. Programs will function on all suitable platforms.
2. Software coherent and automatically coherent pages may be mixed freely.
3. Implementations can use special hardware to expedite coherency operations used for data resident on software coherent pages.
4. Although they are not strictly necessary, coherency instructions may be issued to addresses which are on pages of type automatically coherent with impunity.

There is a page type known as unshared which is designed to contain data which is private to a single CPU. It is normally implemented write-back. In this case the coherency instructions have simple semantics as described in Table I.

TABLE I

| Instruction | Action |
| --- | --- |
| flush | writeback to memory if dirty (i.e. modif) |
| purge | writeback to memory if dirty. Invalidate |
| validate | Invalidate line if not dirty. |

Because data on unshared pages are used by only one user there are no coherency implications and it is not described later.

This permits efficient libraries of software to be written without knowing the coherency implications of data on which the software routines in the library operate. If the software is written with coherency instructions then the library will function on any of the three cached data types—with varying degrees of efficiency.

Three exemplary implementations follow which further illustrate the invention. Note that in each of the following the coherency unit has conventional functionality and design. The novelty lies in the page type usage specified in the TLB and the way the function of the instructions is modified by it.

EXAMPLE 1

In the simplest implementation, data on pages of type software coherent is cached using a write-through procedure and data on pages of type automatically coherent is prevented from residing in the cache.

Operation of the TLB

Figure 6:
FIG. 6 illustrates an entry in the TLB.

As described earlier, the TLB 10 is an associative store comprising a number of entries, one for each page, containing the virtual address VP and the associated physical address RP. A TLB entry is shown in FIG. 6. As can be seen, each entry contains thee bits (denoted CB) which indicate the cache behaviour page type. The operation of the cache system and coherency instructions is governed by the contents of these bits. The names of the page types is given in Table II.

TABLE II

| Name | CB value |
| --- | --- |
| Unshared | 0 |
| Software Coherent | 1 |
| Automatically Coherent | 2 |
| Uncached | 3 |
| Device | 4 |
| Reserved | 5 |
| Reserved | 6 |
| Reserved | 7 |

All memory and coherency instructions are implemented by the operation of first visiting the TLB then performing an action dependent, among other things, on the value in the CB field of the matching TLB entry. For the purposes of this disclosure the TLB is otherwise conventional.

Actions of Load and Store Instructions

The operation of load and store instructions on data resident in the shared cache page types is summarised in Table III.

TABLE III

| Instruction | Software Coherent | Automatically Coherent |
| --- | --- | --- |
| load | if in cache fetch from cache if not in cache fetch line from memory to cache | fetch operand from memory |
| store | if in cache update cached copy and memory if not in cache update memory | update memory |

Actions of Coherency Instructions

The action of flush, purge and validate instructions for this simplest write-through implementation is described in Table IV.

TABLE IV

| | Software Coherent | Automatically Coherent |
| --- | --- | --- |
| Flush | No-Op | No-Op |
| Purge | Invalidate | No-Op |
| Validate | Invalidate | No-Op |

EXAMPLE 2

Figure 1:
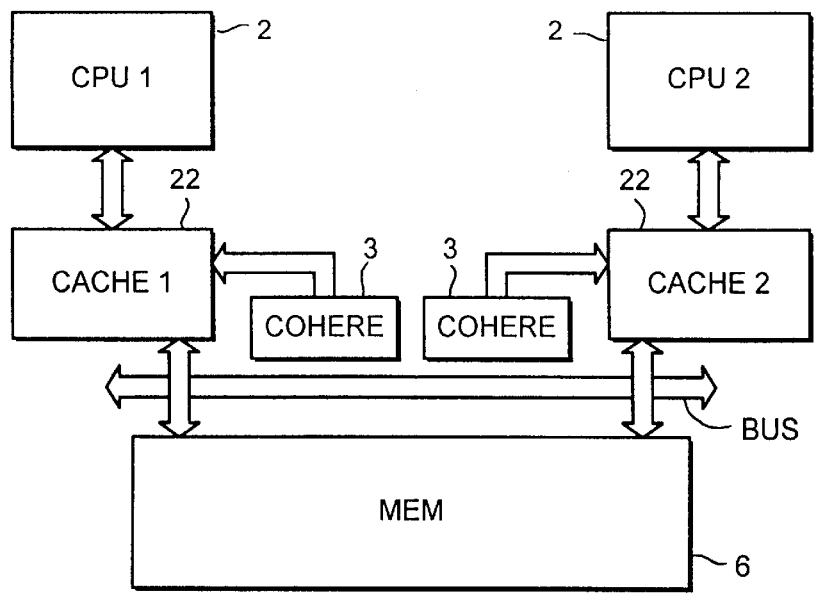
FIG. 1 is a block diagram of automatic coherency control.

A scheme suitable for providing automatically coherent data will now be described with reference to FIGS. 1 and 7. In this implementation, data on pages of type software coherent are cached using a write-through procedure and data on pages of type automatically coherent may be resident in the cache and are implemented using a policy of write-allocate, write through with "snooped" invalidates.

Figure 7:
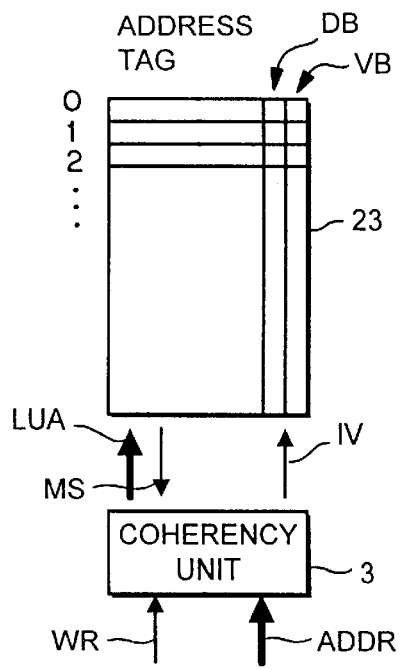
FIG. 7 is a diagram illustrating one implementation of a cache coherency mechanism.

FIG. 7 illustrates a tag RAM 23 which forms part of the cache 22. The tag RAM holds address tags associated with items in the cache. In addition, there is a dirty bit DB and valid VB held for each location in the cache 22. The coherency unit 3 is similar to that referenced 3 in FIG. 1 and allows automatic coherency to be implemented.

Actions of Load and Store Instructions

Automatically Coherent Pages

For data which is resident in the cache 22 and on a page of type automatically coherent, a load instruction will service the request from the cache. A store instruction is implemented as write-through, so that all stores are immediately updated in the cache and main memory. Additionally, all other coherency units on the system bus perform a look-up based on the address LUA (look-up address) which accompanies the store. This is called snooping. If the address matches an address in the tag RAM 23 of the cache 22 then the coherency logic asserts a signal IV (invalidate signal) which results in the valid bit VB being negated. This invalidates matching cache lines in every other cache in the system. For data which is not resident in the cache, and resident on a page of type automatically coherent, a read request simply fetches the line into the cache with no other effects. A write request WR to an address ADDR in similar circumstances first of all reads the data into the cache by transferring a line from main memory into a location in the cache, then updates the cache copy by modifying the bytes in the centre location only. The value is written through to memory and the coherency unit ensures that all other cached copies are invalidated.

Software Coherent Pages

For data which is resident in the cache and on a page of type software coherent, a load instruction will service the request from the cache. If the data is not in the cache it is fetched from main memory. A store request to data which is resident in the cache updates main memory and the cache copy if the data is in the cache. If the store request is to an address not in the cache, only the main memory version is updated. The data is not fetched into the cache.

The operation of load and store instructions on data resident in the shared cache page types is summarised in Table V.

TABLE V

| Instruction | Software Coherent | Automatically Coherent |
|---|---|---|
| load | if in cache fetch from cache | if in cache fetch from cache |
|  | if not in cache fetch line from memory | if not in cache fetch line from memory |
| store | if in cache update cached copy and memory | if in cache update cached copy and memory, then invalidate all other copies |
|  | if not in cache update memory | if not in cache, fetch into cache from memory, update memory, then invalidate all other cached copies |

Actions of Coherency Instructions

The action of flush, purge and invalidate instructions for this example is described in Table VI.

TABLE VI

|  | Software Coherent | Automatically Coherent |
|---|---|---|
| Flush | No-Op | No-Op |
| Purge | Invalidate | Invalidate |
| Validate | Invalidate | No-Op |

FIG. 7 illustrates the operation of coherency hardware which can be used to invalidate caches on write. When a write occurs on the system bus the WriteNotRead line WR and the write address ADDR are latched by all caches in the system which are not attached to the processor performing the write. Each coherency unit causes a look-up to occur on the write address using the look-up signal LUA. If a hit occurs (i.e. the write address is equivalent to the Address Tag and the Valid bit is set), as indicated by the match signal MS, the coherency unit causes the valid bit on the matched cache line to be cleared using the invalidate signal. This invalidates the cache line. If the look-up results in a miss, i.e. no matching cache tag is found, then nothing further happens for that cache. For load instructions which miss in the cache the data is fetched from memory.

EXAMPLE 3

More complex hardware suitable for providing automatically coherent data may be used. In this implementation, data on pages of type software coherent and automatically coherent are implemented identically. They use a write-allocate, write-back with "snarfed" updates to other caches. The scheme is illustrated in FIGS. 1 and 8.

Figure 8:
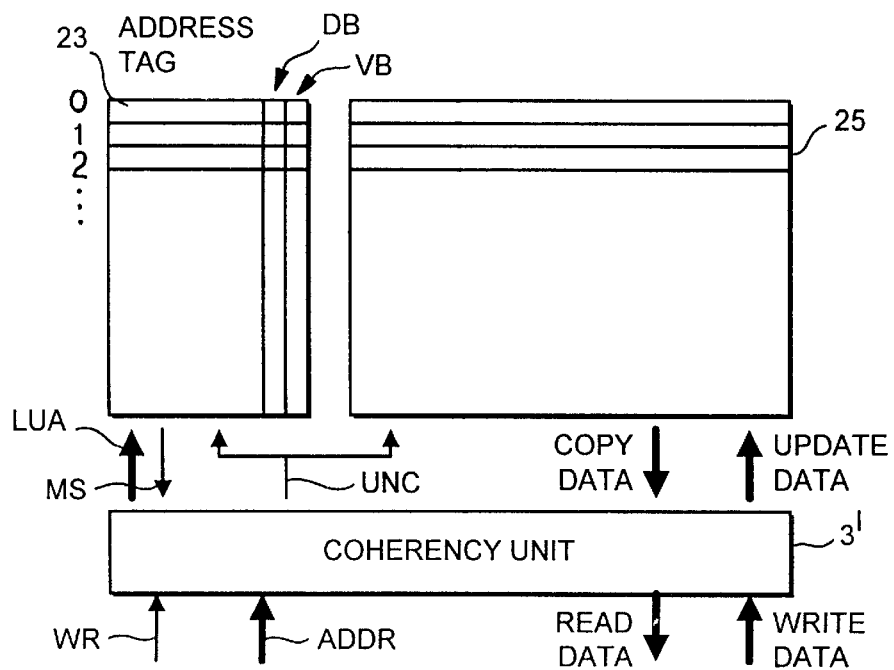
FIG. 8 is a diagram illustrating a more complex implementation of a cache coherency mechanism.

FIG. 8 illustrates the tag RAM 23 and a coherency unit 3'. In addition, a data RAM 25 which forms part of the cache 22 is also illustrated. The data RAM 25 has a plurality of lines corresponding to lines in the tag RAM 23 for holding data items.

Actions of Load and Store Instructions

Load

For data which is resident in the cache and on a page of type automatically coherent, or software coherent, a load instruction will service the request from the cache as normal. If the requested data is not in the cache then the coherent hardware will attempt to locate the data (by its address) in any of the other caches in the system. If this attempt fails it will fetch the data from external memory.

Store

A store to data resident in the cache will cause the update of the copy held in the cache and additionally update all other caches which already hold a copy of the data. The mechanism for this is as follows. When a store occurs, which hits in the cache, the cached copy is updated. Concurrently, the new value is copied onto the system bus and all other coherency units on the system bus perform a look-up based on the address which accompanies the store. If the address matches an address in the tag RAM then the coherency logic asserts a signal which results in the cache updating the line with the data on the bus. This is a conventional technique sometimes referred to as snarfing. For data which is not present in the cache when a store is attempted, the data is first fetched as described earlier for a load, and then the write takes place on the resident line.

The operation of load and store instructions on data resident in the shared cache page types is summarised in Table VII.

TABLE VII

| Instruction | Automatically Coherent/ Software Coherent |
|---|---|
| load | if in cache fetch from cache if not in cache fetch line from another CPU's cache, if this fails fetch from memory |
| store | if in cache update cached copy then update all other cached copies if not in cache fetch from another CPU's cache, if this fails fetch from memory. Update cache with store then update all other cached copies. |

Actions of Coherency Instructions

The action of coherency instructions for a more complex write-back implementation is described in Table VIII.

TABLE VIII

| | Automatically Coherent/ Software Coherent |
|---|---|
| Flush | No-Op |
| Purge | Write-back to memory if dirty then invalidate |
| Validate | No-Op |

FIG. 8 illustrates the action of coherency hardware which can be used to update caches on write or take a copy of data on a read.

Coherency Unit Store Operation

When a store occurs on the system bus the WriteNotRead line WR and the address ADDR are latched by all caches in the system which are not attached to the processor performing the store. Each such coherency unit causes a look-up to occur on the store address by supplying the address to the tag RAM 23 as the look-up address LUA. If a hit occurs, as indicated by the match signal MS, the coherency unit causes write data also called update data to be copied into the cache using the UpdateNotCopy signal UNC. This updates the cache line. If the look-up results in a miss, i.e. no matching cache tag is found, then nothing further happens for that cache.

Coherency Unit Load Operation

When a load occurs on the system bus the WriteNotRead line WR and the address ADDR are latched by all caches in the system which are not attached to the processor performing the load. Each such coherency unit causes a look-up to occur on the load address by supplying it as the Look-up Address LUA. If a hit occurs, as indicated by the match signal MS, the coherency unit causes the cached copy, in the data RAM 25 to be copied onto the system bus using the copy data and read data lines and using the UpdateNotCopy signal UNC. When the data is placed on the system bus the processor performing the load will copy it into its cache. If there are several caches which have copies of this data a system bus arbiter (not shown) selects one (they are all the same) and uses it to drive the bus. If the look-up results in a miss, i.e. no matching cache tag is found, then nothing further happens for that cache.

The present cache coherency mechanism provides the following instructions. In these instructions, the denotation dmem refers to the main memory of the computer system.

Flush

These instructions are provided to make certain that dirty data is visible to other users. That is, the item held at the relevant cache location is written back to the address in main memory held at that cache location with the item.

| flushline | |
|---|---|
| flush a line base,offset | unsigned(x) unsigned(x) |

| Ensure that all previous writes to the line containing dmem[base+offset] are visible to other users sharing this data. |
|---|

| flushpart | |
|---|---|
| flush a partition base, offset | unsigned(x) unsigned(x) |

| Flush a dirty cache line which could be replaced by a memory access to dmem[base+offset]. Flushing a line ensures that all previous writes to that line are visible to other users sharing this data. If all replaceable lines are clean the instruction has no effect. |
|---|

Purge [for data items]

These instructions are provided to remove data from the cache—they write back data items in the cache to addresses in main memory specified with those items, then invalidate the cache contents.

| purgeline | |
|---|---|
| purge a line base, offset | unsigned(x) unsigned(x) |

| Write back to memory any dirty items in the line containing dmem[base+offset] and invalidate the line in all cases |
|---|

| purgepart | |
|---|---|
| purge a partition base, offset | unsigned(x) unsigned(x) |

| Purge a valid cache line which could be replaced by a memory access to dmem[base+offset]. A line is purged by writing to memory any dirty data it contains and then invalidating the line. If all replaceable lines are invalid the instruction has no effect. |
|---|

In another embodiment, the partition-based flush instruction can have the following form. In the following instruction, var<a:b> is bits a to b of the variable var.

| flushpart | |
|---|---|
| flush a partition base, offset | unsigned(x) unsigned(x) |

| addr←base + offset addrø<12:63>←addr<12:63> For index=ø, index<4096, index+=32   addrø<0:11>=index<0:11> Flush a plurality of dirty cache lines which could be replaced by a memory access to dmem [addrø] |
|---|

The purge instruction can take a similar form where a single instruction is to operate on a plurality of lines in the cache.

What is claimed is:

1. A computer system comprising:
 a plurality of processors, each of the plurality of processors comprising an execution unit for executing a sequence of instructions, and at least one of the processors having associated therewith a cache memory having a plurality of cache locations for holding items for use by the at least one processor;

storage circuitry having addressable storage locations in a memory address space of the at least one processor in which items are stored for use by the plurality of processors;

a behaviour store for holding in association with an address of an item a cache behaviour that identifies cacheable behaviours of the item, wherein the cacheable behaviours include a software coherent behaviour wherein cache coherency is controlled by software and an automatically coherent behaviour wherein cache coherency is maintained by a hardware cache coherency unit, and wherein the instructions for execution by the execution unit include cache coherency instructions which each specify an operation to be executed on the contents of a specified cache location and a specified address in the storage circuitry;

each processor being operable responsive to the cache coherency instructions to execute an operation on the contents of the specified cache location and to effect a cache coherency operation to render the contents of the specified cache location coherent with the storage circuitry in a manner dependent on the cacheable behaviour of the specified address and whether or not the processor executing the operation contains a hardware cache coherency unit for automatically implementing coherency.

2. A computer system according to claim 1, further comprising:

a hardware cache coherency unit for automatically implementing coherency and wherein the cache coherency instructions effect a cache coherency operation for automatically coherent and software coherent behaviour dependent on the nature of the hardware cache coherency unit.

3. A computer system according to claim 1, wherein the computer system has no hardware cache coherency unit for automatically implementing coherency, and wherein items having an automatically coherent behaviour are denied access to the cache memory.

4. A computer system according to claim 1, wherein each of the plurality of processors has a respective cache memory associated therewith.

5. A computer system according to claim 1, wherein the storage circuitry comprises a main memory accessible by each of the plurality of processors.

6. A computer system according to claim 1, wherein each item in the cache memory is stored in association with a valid bit which indicates whether or not that item is valid.

7. A computer system according to claim 1, wherein each item in the cache memory is stored in association with a dirty bit which indicates whether or not that item has been modified with respect to the storage circuitry.

8. A computer system according to claim 1, wherein the cacheable behaviours include an unshared behaviour for items unique to one of the plurality of processors.

9. A computer system according to claim 1, wherein the cacheable behaviours include an uncacheable behaviour for accesses to memory devices other than the storage circuitry.

10. A computer system according to claim 1, wherein the cacheable behaviours include a device behaviour for accesses to devices other than memory devices, said devices being addressable in the memory address space of the at least one processor.

11. A computer system according to claim 1, wherein the cache coherency instructions include a flush instruction which makes dirty items in the cache memory associated with the at least one processor visible to other processors of the plurality of processors.

12. A computer system according to claim 1, wherein the cache coherency instructions include a purge instruction which removes items from the cache memory.

13. A computer system according to claim 1, wherein the cache coherency instructions include a coherent instruction which makes dirty items in the cache memory associated with the at least one processor visible to other processors of the plurality of processors and ensures that stale items are not read from the cache memory.

14. A computer system according to claim 1, wherein the cache coherency instructions include a validate instruction which ensures that stale items are not read from the cache memory.

15. A computer system according to claim 1, wherein each item in each cache memory is stored in association with a valid bit which indicates whether or not that item is valid.

16. A computer system according to claim 1, wherein each item in each cache memory is stored in association with a dirty bit which indicates whether or not that item has been modified with respect to the storage circuitry.

17. A computer system according to claim 1, wherein each processor has a user mode of operation and a privileged mode of operation, and wherein the cache coherency instructions can be executed in the user mode of operation.

18. A method of modifying a coherency status of a contents of a cache in a computer system that includes a plurality of processors each having an execution unit for executing a sequence of instructions and at least one of the processors having associated therewith a cache memory, and storage circuitry having addressable storage locations in a memory address space of the at least one processor in which items are stored for use by the plurality of processors, the method comprising acts of:

defining for each item a cacheable behaviour of the item, wherein the cacheable behaviours include a software coherent behaviour wherein cache coherency is controlled by software and an automatically coherent behaviour wherein cache coherency is maintained by a hardware cache coherency unit;

holding in a behaviour store in association with an address for each item a cache behaviour identifying the cacheable behaviour of the item;

executing in the execution unit cache coherency instructions which each specify an operation to be executed on a contents of a specified cache location in the cache memory and a specified address in the storage circuitry; and executing an operation on the contents of the specified cache location and effecting a cache coherency operation to render the contents of the specified cache location coherent with the storage circuitry in a manner dependent on the cacheable behaviour of the specified address and whether or not the processor executing the operation contains a hardware cache coherency unit for automatically implementing coherency.

19. A method according to claim 18, wherein the computer system further comprises a hardware cache coherency unit for automatically implementing coherency and wherein said cache coherency instructions effect a cache coherency operation for automatically coherent and software coherent behaviour dependent on the nature of the hardware cache coherency unit.

20. A method according to claim 18, wherein the computer system has no hardware cache coherency unit for automatically implementing coherency, and wherein items having an automatically coherent behaviour are denied access to the cache memory.

21. A method according to claim 18, wherein each item in the cache memory is stored in association with a valid bit which indicates whether or not that item is valid.

22. A method according to claim 18, wherein each item in the cache memory is stored in association with a dirty bit which indicates whether or not that item has been modified with respect to the storage circuitry.

23. A method according to claim 18, wherein the cacheable behaviours include an unshared behaviour for items unique to one of the plurality of processors.

24. A method according to claim 18, wherein the cacheable behaviours include an uncacheable behaviour for accesses to memory devices other than the storage circuitry.

25. A method according to claim 18, wherein the cacheable behaviours include a device behaviour for accesses to devices other than memory devices, said devices being addressable in the memory address space of the at least one processor.

26. A method according to claim 18, wherein the cache coherency instructions include a flush instruction which makes dirty items in the cache memory associated with the at least one processor visible to other of the plurality of processors.

27. A method according to claim 18, wherein the cache coherency instructions include a purge instruction which removes items from the cache memory.

28. A method according to claim 18, wherein the cache coherency instructions include a validate instruction which ensure that stale items are not read from the cache memory.

29. A method according to claim 18, wherein each item in each cache memory is stored in association with a valid bit which indicates whether or not that item is valid.

30. A method according to claim 18, wherein each item in each cache memory is stored in association with a dirty bit which indicates whether or not that item has been modified with respect to the storage circuitry.

31. A method according to claim 18, wherein each processor has a user mode of operation and a privileged mode of operation, and wherein the act of executing the operation includes an act of executing the operation in the user mode.

* * * * *